D. DALZELL.
Device for Attaching Hubs to Axles.
No. 160,007. Patented Feb. 23, 1875.
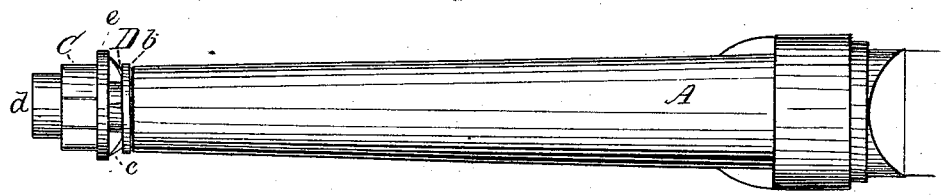
Fig. 1.
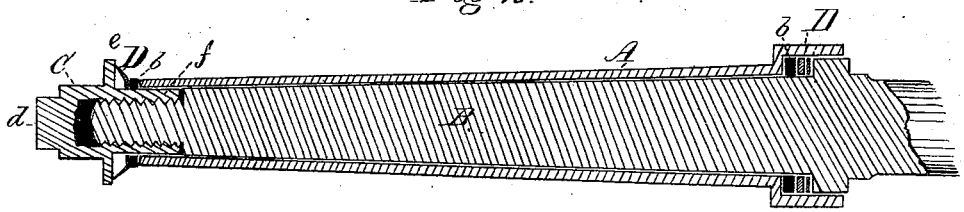
Fig. 2.
Fig. 3. 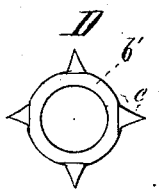 
Fig. 4. 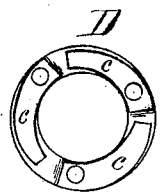 
WITNESSES
T. D. Durand
Nat. E. Oliphant
By
INVENTOR
David Dalzell.
Chas H. Fowler.
Attorney.
THE GRAPHIC CO.PHOTO-LITH. 39 & 41 PARK PLACE, N.Y.

UNITED STATES PATENT OFFICE.

DAVID DALZELL, OF SOUTH EGREMONT, MASSACHUSETTS.

IMPROVEMENT IN DEVICES FOR ATTACHING HUBS TO AXLES.

Specification forming part of Letters Patent No. 160,007, dated February 23, 1875; application filed November 30, 1874.

*To all whom it may concern:*

Be it known that I, DAVID DALZELL, of South Egremont, in the county of Berkshire and State of Massachusetts, have invented certain new and useful Improvements in Carriage-Axles; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to means for preventing the lateral or endwise movement of carriage-wheels upon their axles, which is generally caused by the wear of the washer; and my invention consists in combining with such washers a spring or pressure washer to keep the same up against the end of the axle-box, as will be hereinafter more fully described.

Figure 1 of the drawing represents a perspective view of a carriage-axle; Fig. 2, a longitudinal central section; Fig. 3, a plan and side view of my spring when detached from the axle; Fig. 4, a modification of the same.

Similar letters of reference indicate corresponding parts.

A in the drawings represents the box, cast or otherwise formed of metal; and B, the axle. C represents a nut, cast with a cap, $d$, on its outer side, and with a flange, $e$, on its inner side, having a tapped tube, $f$, projecting from the flange, and provided on its interior with screw-threads to enable it to be secured upon the threaded end of the axle B. After the box A is in place on the axle the nut C then serves to hold the axle and box together. Between the flange $e$ and end of the box is inserted a packing or washer, $b$, composed of leather or other soft or flexible material. Between this packing or washer and the nut C is placed a spring or pressure washer, D, consisting of a flat circular plate, $b'$, provided with spring-arms $c$. This pressure-washer serves to keep the packing or leather washer $b$ up against the end of the axle-box; also serving as an intermediate guard to prevent the metal surfaces of the nut and axle-box from coming in contact, and thereby protecting and securing the same from wear.

If found desirable, the packing or washer $b$, together with the spring or pressure washer D, may be used upon both ends of the axle and box, as illustrated in Fig. 2 of the drawings.

It will readily be seen the advantages of such a washer, in connection with a packing or washer of leather or other soft material, as it prevents the wear of the metallic faces of the nut and axle-box, and keeps the packing or washer $b$ at all times snugly up against the end of the box, thereby keeping the wheel steady upon the axle, and entirely preventing any lateral or endwise motion that would otherwise result from the wear of the parts and the leather washer, caused by the continual motion of the wheel upon the axle.

Heretofore spiral or coiled springs have been used, but with many objections, as such a spring would necessarily shorten the bearing-surface of the box upon the axle, as well as the great danger of its getting out of order, caused by the dirt and sand lodging or getting in between the coils. I therefore lay no claim to such construction. Nor do I wish to be understood as claiming the spring or pressure washer D independently of the washer $b$, as such form of springs I believe to be old; but What I do claim as my invention, and desire to secure by Letters Patent, is—

In combination with a carriage-axle, and axle-box, of a suitable elastic washer and a spring or pressure washer, D, substantially as and for the purpose set forth.

In testimony that I claim the foregoing as my own invention I affix my signature in presence of two witnesses.

DAVID DALZELL.

Witnesses:
CRAIG McCAUSLAND,
NAT. E. OLIPHANT.